US010851820B2

(12) United States Patent
Spearing

(10) Patent No.: US 10,851,820 B2
(45) Date of Patent: Dec. 1, 2020

(54) SELF-LOCKING EDGE CLIP ASSEMBLY

(71) Applicant: A. Raymond et Cie, Grenoble (FR)

(72) Inventor: Jim Raymond Spearing, Oxford, MI (US)

(73) Assignee: A. Raymond et Cie, Grenoble (FR)

( * ) Notice: Subject to any disclaimer, the term of this patent is extended or adjusted under 35 U.S.C. 154(b) by 21 days.

(21) Appl. No.: 16/235,506

(22) Filed: Dec. 28, 2018

(65) Prior Publication Data

US 2020/0208662 A1 Jul. 2, 2020

(51) Int. Cl.
*F16B 5/06* (2006.01)
*F16B 2/22* (2006.01)

(52) U.S. Cl.
CPC .............. *F16B 5/0635* (2013.01); *F16B 2/22* (2013.01)

(58) Field of Classification Search
CPC .......... F16B 5/0635; F16B 2/22; F16B 5/125; F16B 5/121; F16B 21/073; F16B 2/245; B60R 13/0206
See application file for complete search history.

(56) References Cited

U.S. PATENT DOCUMENTS

| | | | |
|---|---|---|---|
| 1,030,386 A | 6/1912 | Comeau | |
| 2,250,469 A | 7/1941 | Crow | |
| 3,137,027 A * | 6/1964 | Birkle | A47H 13/01 16/87.2 |
| 3,214,810 A | 11/1965 | Mathison | |
| 3,808,651 A | 5/1974 | Almendarez | |
| 4,684,305 A | 8/1987 | Dubost | |
| 4,883,397 A | 11/1989 | Dubost | |
| 5,539,963 A | 7/1996 | Fujiwara et al. | |
| 2005/0105987 A1 | 5/2005 | Giugliano et al. | |
| 2006/0066080 A1 | 3/2006 | Ikeda et al. | |
| 2008/0229550 A1 | 9/2008 | Elsner | |
| 2011/0154623 A1 | 6/2011 | Schmidt et al. | |
| 2012/0124782 A1 | 5/2012 | Elsner et al. | |
| 2013/0092803 A1 | 4/2013 | Fujiwara | |
| 2014/0017025 A1 | 1/2014 | Hemingway et al. | |
| 2015/0211565 A1 | 7/2015 | Benedetti | |

(Continued)

FOREIGN PATENT DOCUMENTS

| | | |
|---|---|---|
| DE | 199614 T1 | 10/1987 |
| DE | 69000428 T2 | 5/1993 |
| DE | 9210597 U1 | 12/1993 |

(Continued)

OTHER PUBLICATIONS

Machine assisted translation of DE9210597U1 obtained from https://worldwide.espacenet.com on Feb. 27, 2019, 10 pages.

(Continued)

*Primary Examiner* — Robert Sandy
*Assistant Examiner* — Louis A Mercado
(74) *Attorney, Agent, or Firm* — Warner Norcross + Judd LLP

(57) ABSTRACT

The present disclosure provides an edge clip assembly for attachment of a component, and, more specifically, to an edge clip assembly which is self-locking. The edge clip assembly includes a clip body and a spacer provided within the clip body, and further includes an interlock securing the spacer in a final position in which the clip body can be engaged with the component to hold the component under tension.

20 Claims, 6 Drawing Sheets

(56) References Cited

U.S. PATENT DOCUMENTS

2015/0321622 A1  11/2015  Dickinson et al.
2017/0114809 A1   4/2017  Stickelberger et al.

FOREIGN PATENT DOCUMENTS

| DE | 202007000938 U1 | 4/2007 |
| DE | 102008038871 A1 | 2/2010 |
| DE | 102008059360 A1 | 6/2010 |
| DE | 102015202409 A1 | 8/2016 |
| EP | 3263916 A1 | 6/2016 |
| WO | 2012017706 A1 | 2/2012 |
| WO | 2012125360 A2 | 9/2012 |
| WO | 2017074860 A1 | 5/2017 |

OTHER PUBLICATIONS

Machine assisted translation of DE102015202409A1 obtained from https://worldwide.espacenet.com on Feb. 27, 2019, 17 pages.
Machine assisted translation of EP3263916A1 obtained from https://worldwide.espacenet.com on Feb. 27, 2019, 11 pages.
Extended European Search Report for Application No. EP 19 21 7926, dated Apr. 29, 2020.

\* cited by examiner

SELF-LOCKING EDGE CLIP ASSEMBLY

FIELD OF THE INVENTION

The present disclosure generally relates to a fastener and, more specifically, to a self-locking edge clip assembly for attachment of a component and/or coupling two components together.

DESCRIPTION OF THE RELATED ART

Clip fasteners, or edge clips replace traditional screw fixings in many applications, and have a variety of uses in a wide range of industries. Generally speaking, edge clips are utilized for fastening two or more components together. One challenge faced by industries reliant on edge clips relates to fastening locations thereof, which may offer only limited access for assembly during manufacture and removal and/or adjustment during maintenance. Another challenge includes damage to the fastened components, as traditional edge clips can scratch or gauge the components, which can be particularly problematic when the surface of the component is painted or has another surface coating. For example, a scratched surface undesirably impacts aesthetics and, for metal surfaces, potential passivation properties and corrosion resistance. Each of these challenges has the potential to increase assembly cost because of extra assembly time, as well as potentially requiring repair time for the components.

Edge clips commonly find particular utility in the automotive sector. In the automotive sector, edge clips have many uses, including in air bag assembly, window construction, instrument panels and interior and exterior trim attachment.

Modern demands on the design and construction of edge clips mean that new clip fastener solutions need to contribute to ease of assembly as used in production, particularly in view of increasing automation, and provide excellent attachment strength, while maintaining high reliability and low production costs. Compliance with the requirements of the various industries, including the automotive industry, has proved challenging to current edge clip designs.

BRIEF SUMMARY OF THE INVENTION

A self-locking edge clip assembly is provided herein. In an exemplary embodiment, the edge clip assembly includes a clip body changeable between an open configuration in which a component may be freely inserted and an engaged configuration in which the component is captured thereby. The edge clip assembly also includes a spacer slideably and linearly moveable in the clip interior between an initial position in which the clip body is in the open configuration and a final position in which the clip body is in the engaged configuration, the spacer extending partially outside the clip body when in the initial position, and an interlock securing the spacer in the final position.

In some embodiments, the spacer comprises a rib extending along a surface thereof and the clip body defines a slot, and the interlock can be formed between the rib and the slot.

In these and other embodiments, the clip body can include a first clip leg, a second clip leg, and a clip end connecting the first and second clip legs, the first clip leg, the second clip leg, and the clip end together defining a clip interior having an open end, at least one of the first clip leg and the second clip leg having a slot defined thereby, and the first clip leg and the second clip leg being in spaced apart positions to define the open end when the clip body is in the open configuration.

In another alternative exemplary embodiment, the edge clip assembly includes a u-shaped clip body comprising a first clip leg, a second clip leg, a clip end wall connecting the first and second clip legs, and a slot defined by the first clip leg. The edge clip assembly further includes a u-shaped spacer slideably moveable in the clip body between an initial position in and a final position, the spacer comprising a first spacer leg, a second spacer leg, a spacer end wall connecting the first and second spacer legs, and a rib extending from the first spacer leg. The first and second spacer legs extend partially outside the clip body when in the initial position and being disposed entirely within the clip body when in the final position. An interlock is formed between the rib and the slot, the interlock securing the spacer in the final position.

These and other features and advantages of the present disclosure will become apparent from the following description of particular embodiments, when viewed in accordance with the accompanying drawings and appended claims.

DETAILED DESCRIPTION OF THE INVENTION

A self-locking edge clip assembly is described below. As will be appreciated from the description herein, the self-locking (or self-closing or self-latching or self-retaining) edge clip assembly, also referred to herein as the "edge clip assembly," has myriad end use applications but is generally used to hold a component under tension to the edge clip assembly, thus providing broad application across multiple industries. As but one example, the edge clip assembly may be used to secure one component of a vehicle (e.g. a panel) to another component of the vehicle during assembly. However, end use applications of the edge clip assembly are not so limited, including with respect to the automotive industry.

At least some embodiments of the edge clip assembly provided herein functions through the various elements thereof, as described below, to provide clearance from a biting feature of the edge clip assembly until the component is fully seated and thereby avoids scratching or gauging the component. By avoiding the scratching or gauging of a painted surface, the risk of corrosion is also minimized or entirely eliminated. At least some embodiments of the edge clip assembly provided herein functions through the various elements thereof, as described below, to function as a traditional edge clip fastener in the absence of a clearance component. At least some embodiments of the edge clip assembly provided herein functions through the various elements thereof, as described below, to prevent interlocking of the biting feature during shipping and/or transit, thereby arriving at its end destination ready to use. At least some embodiments of the edge clip assembly provided herein function through the various elements thereof, as described below, to support a cable tie in multiple orientations, thereby offering flexible application across multiple industries. As such, certain features of the spacer may be considered functional, but may also be implemented in different aesthetic configurations.

Figure 1:
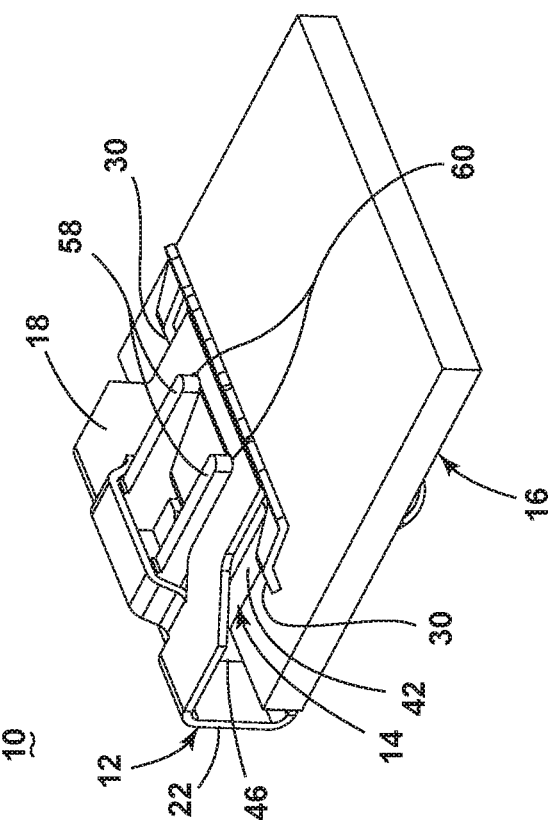
FIG. 1 is a perspective view of a self-locking edge clip assembly in accordance with one embodiment, shown in an initial position.
Figure 2:
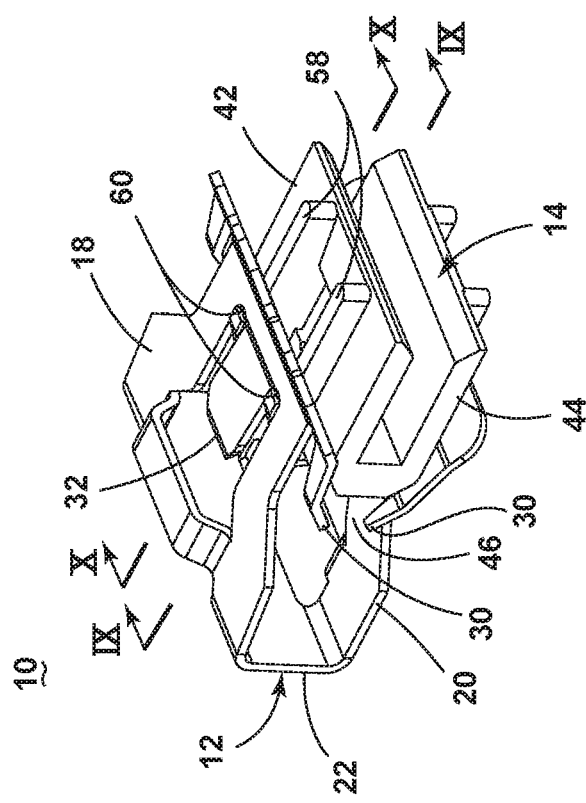
FIG. 2 is a perspective view of the edge clip assembly shown in a final position in which a component is captured thereby.

In an exemplary embodiment shown in FIGS. 1-2, wherein like numerals indicate corresponding parts throughout the several views, the edge clip assembly is illustrated and generally designated at 10. The edge clip assembly 10 includes a clip body 12 and a spacer 14 provided within the clip body 12. The clip body 12 can be changeable between an open configuration, one example of which is shown in FIG. 1, wherein a component may be freely inserted, and an engaged configuration, wherein a component 16 is captured by the clip body 12, one example of which is shown in FIG. 2. The spacer 14 is slideably moveable relative to the clip body 12 between an initial position, one example of which is shown in FIG. 1, in which the clip body 12 is in the open configuration and a final position, one example of which is shown in FIG. 2, in which the clip body 12 is in the engaged configuration. As described in further detail below, the spacer 14 provides clearance between the component 16 and a biting feature of the clip body 12 until the component 16 is fully seated, i.e. until the clip body 12 is in the engaged configuration, and thereby avoids scratching or gauging the component 16.

The clip body 12 and spacer 14 can comprise any material capable of generating a clamp load to hold the component 16 with enough tension so as to prevent the component 16 from separating from the edge clip 10. The spacer 14 can further be composed a material which will not scratch, gauge, or otherwise damage the surface of the component 16.

In some embodiments, the spacer 14 can comprise a polymeric material, such as a resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the resin is selected from thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

The spacer 14 can be made via various techniques, which is typically a function of its material. For example, the spacer 14 can be made via molding, extrusion, etc. Alternatively, the spacer 14 can be made via an additive manufacturing process, e.g. a 3-D printing process.

The clip body 12 can comprise a metal or a metal alloy, such as steel, stainless steel, aluminum, or carbon steel.

However, myriad materials may be used to manufacture the spacer 14 and the clip body 12, with each typically being selected as a function of availability, cost, performance/end use applications, etc. Moreover, metals, metal alloys, resins are not exhaustive of suitable materials that may be used.

Figure 3:
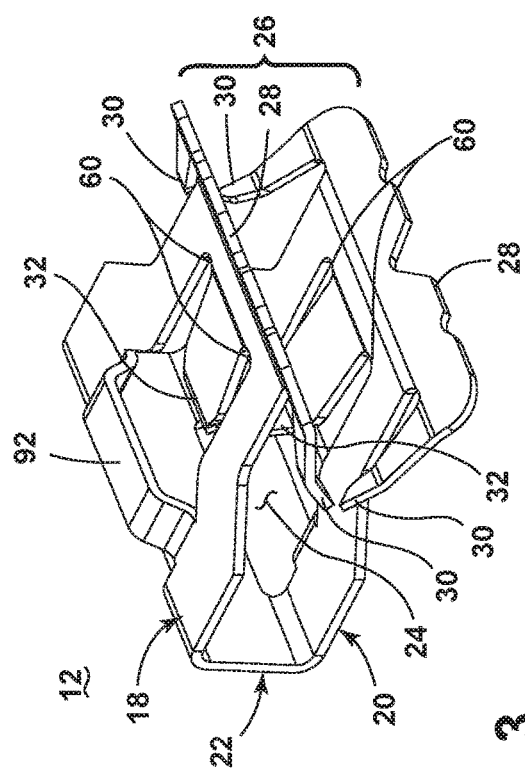
FIG. 3 is a perspective view of a clip body of the edge clip assembly in accordance with the embodiment shown in FIG. 1.
Figure 5:
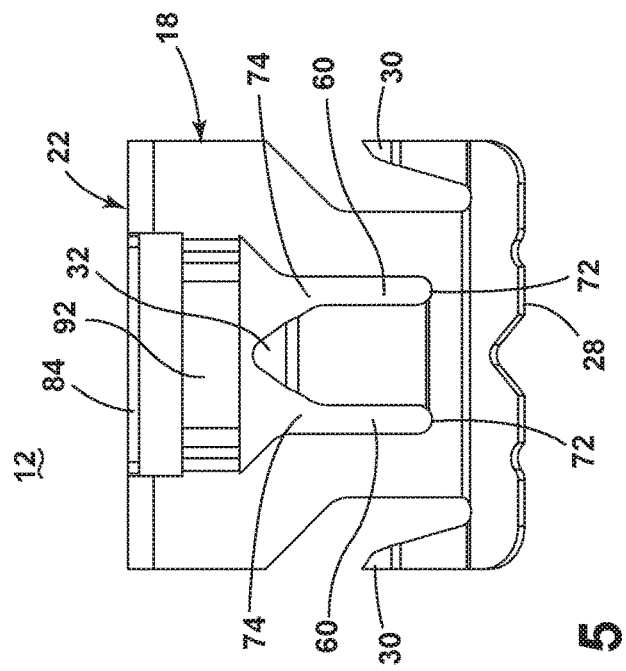
FIG. 5 is a top view of the clip body.
Figure 4:
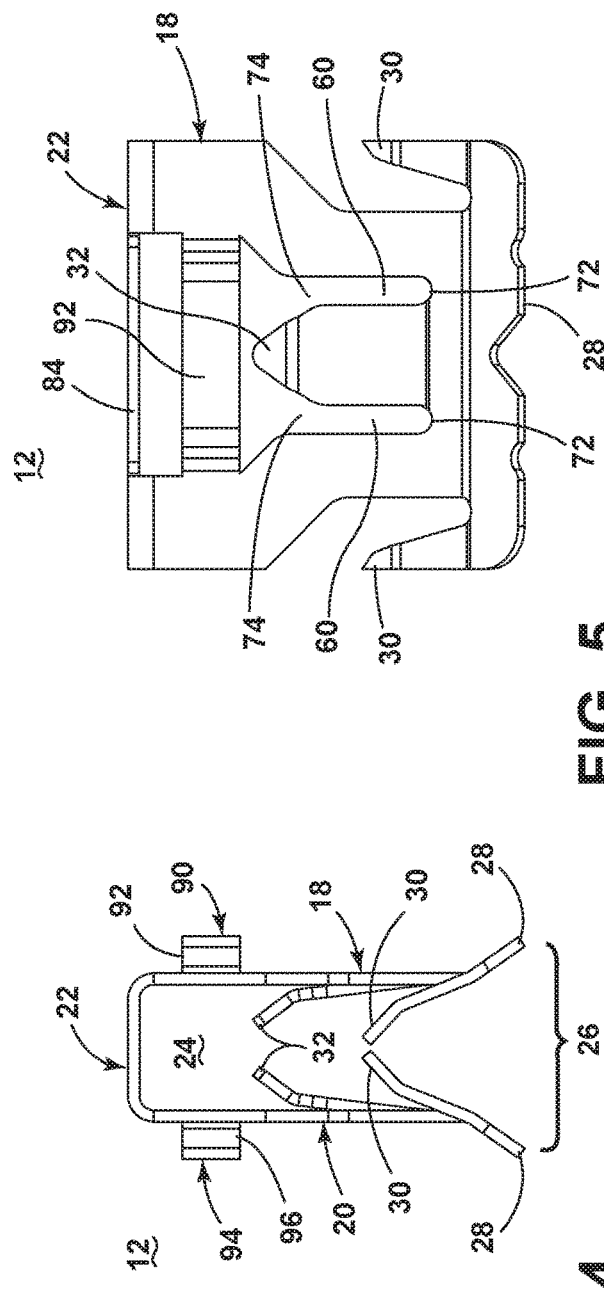
FIG. 4 is a side perspective view of the clip body.

Referring to FIGS. 3-5, the clip body 12 includes a first clip leg 18 and a second clip leg 20. The first and second clip legs 18, 20 can be connected by a clip end 22, which is at least partially closed so as to connect the first and second clip legs 18, 20. The clip end 22 can be formed as one or more end walls connecting the legs 18, 20, and can be curved or straight. In certain embodiments, the clip body 12 is U-shaped.

The clip legs 18, 20 and end 22 together define a clip interior 24 having an open end 26. The open end 26 can generally be defined between free ends of the clip legs 18, 20 opposite the clip end 22. One or both of the free ends of the clip legs 18, 20 can comprise an out-turned end 28 opposite the clip end 22. The out-turned end 28 allows for easy insertion of the component 16 into the clip interior 24.

To assure that the component 16 is securely held to the clip body 12, at least one biting feature can be provided on the clip body 12. One embodiment of a biting feature is a component-gripping barb 30, 32 provided on at least one of the clip legs 18, 20. Optionally, at least one barb is provided on each leg 18, 20, and/or multiple barbs are provided per leg 18, 20. In the illustrated embodiment, two lateral barbs 30 are formed on the clip first leg 18 and a medial barb 32 is formed in between the lateral barbs 30. Similarly, two lateral barbs 30 are formed on the second clip leg 20 and a medial barb 32 is formed in between the lateral barbs 30. The barbs 30, 32 assure that only unidirectional movement of the component 16 into the clip body 12 is possible, and resist movement of the component 16 out of the clip body 12. The barbs 30, 32 can have a variety of shapes, including but not limited to flat, sharp, round, or spiked. In other embodiments, the clip body 12 can be configured to apply locking tension to the component 16 without at least one biting feature.

Figure 6:
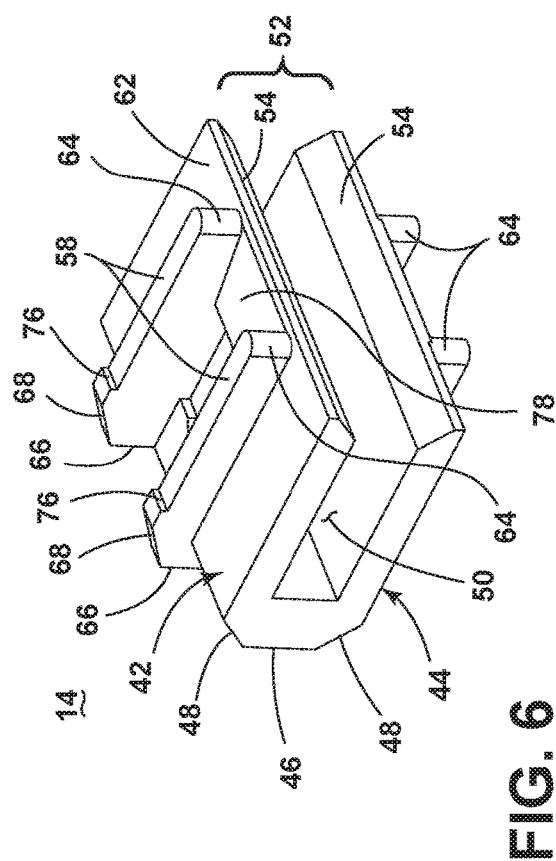
FIG. 6 is a perspective view of a spacer of the edge clip assembly in accordance with the embodiment shown in FIG. 1.
Figure 8:
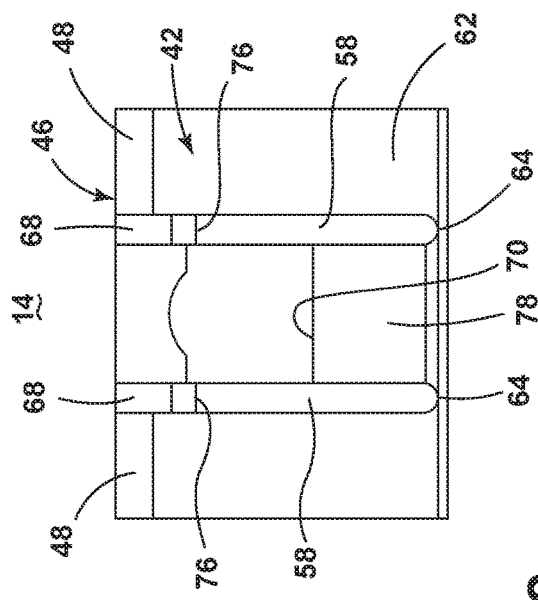
FIG. 8 is a top view of the spacer.
Figure 7:
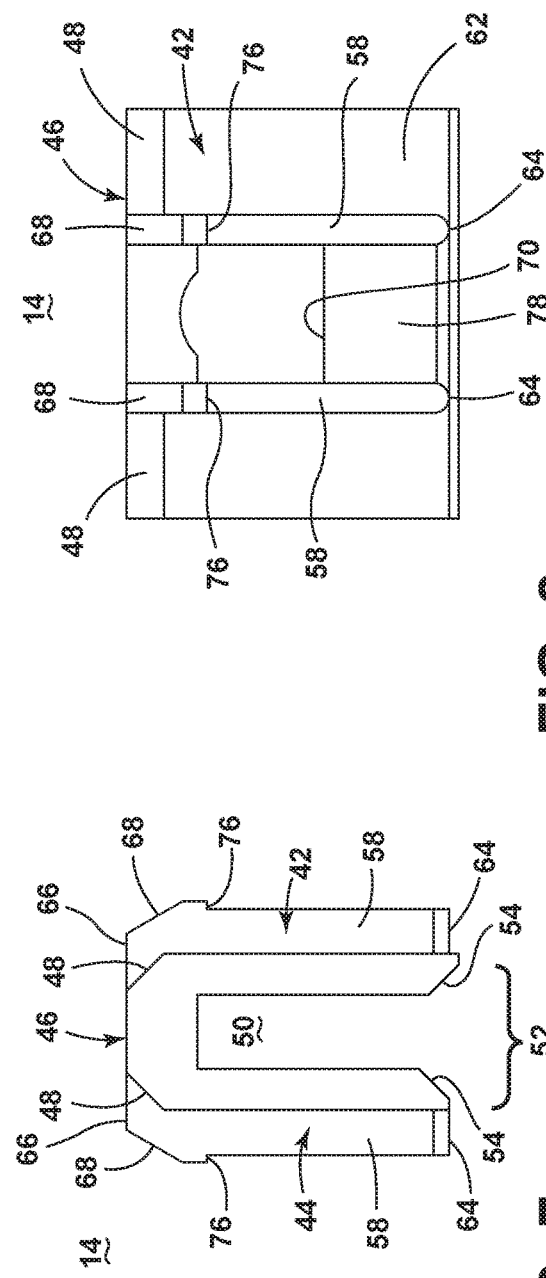
FIG. 7 is a side perspective view of the spacer.

Referring to FIGS. 6-8, the spacer 14 can include a first spacer leg 42 and a second spacer leg 44. The first and second spacer legs 42, 44 can be connected by a spacer end 46, which is at least partially closed so as to connect the first and second spacer legs 42, 44. The spacer end 46 can be formed as one or more end walls connecting the legs 42, 44, and can be curved or straight. Optionally, the spacer 14 is U-shaped. One or both of the edges 48 of the spacer end 46 joining the legs 42, 44 can be beveled. The beveled edge 48 allows for easy sliding of the spacer 14 within the clip body 12.

The spacer legs 42, 44 and end 46 can together define a spacer interior 50 having an open end 52. The open end 52 can generally be defined between free ends of the spacer legs 42, 44 opposite the spacer end 46. One or both of the free ends of the spacer legs 42, 44 can comprise a tapered edge 54, such as a beveled or chamfered edge 54. The tapered edge 54 allows for easy insertion of the component 16 into the clip interior 24. The open end 52 and edge 54 can be orthogonal to the direction of sliding and/or movement of the spacer 14, as shown herein. Alternatively, the open end 52 and edge 54 can be non-orthogonal to the direction of sliding and/or movement of the spacer 14, such as by having an angled edge 54.

As introduced above, the spacer 14 is slideably moveable in the interior 24 of the clip body 12, between an initial position, which can be an as-shipped position, in which the clip body 12 is in the open configuration, an example of which is shown in FIG. 1, and a final position in which the clip body 12 is in the engaged configuration, an example of which is shown in FIG. 2. When in the initial position, the spacer 14 can extend partially outside the clip body 12. When in the final position, the spacer 14 can be disposed entirely within the clip body 12. In the illustrated embodiment, the first and second spacer legs 42, 44 can extend partially outside the clip body 12 when in the initial position and can be disposed entirely within the clip body 12 when in the final position. More specifically, the free ends of the spacer legs 42, 44 can protrude beyond the free ends of the clip legs 18, 20 in the initial position. The spacer end 46, and portions of the spacer legs 42, 44, can be disposed within the clip body 12 in both the initial and final positions, with the spacer 14 moving linearly within the clip body 12 to translate the spacer end 46 closer to the clip end 22 in the final position.

An interlock can be provided for securing the spacer 14 in the final position, in which the clip body 12 is in the engaged configuration and applies locking tension to the component 16. The interlock can further coordinate the movement of the spacer 14 relative to the clip body 12, and may aid in constraining the spacer 14 for linear movement within the clip interior 24.

In one embodiment, the interlock can comprise at least one rib 58 extending from the spacer 14 and at least one slot 60 defined by the clip body 12. The interlock can be formed between the rib 58 within the slot 60, i.e. by the engagement or registry of the rib 58 with the slot 60.

The at least one rib 58 can extend along a surface of the spacer 14, such as along an outer surface 62 of one or the spacer legs 42, 44. Optionally, at least one rib 58 is provided on each leg 42, 44, and/or multiple ribs 58 are provided per leg 42, 44. In the illustrated embodiment, two ribs 58 are formed on the first spacer leg 42 and two ribs 58 are formed on the second spacer leg 44. The ribs 58 on each leg 42, 44 can be parallel to each other. The ribs 58 on each leg 42, 44 can have the same or different lengths.

Referring to FIG. 7, the ribs 58 can include a first end 64 and a second end 66, with the first end 64 nearer or at the open end 52 of the spacer 14 and the second end 66 nearer or at the spacer end 46. The second end 66 can comprise a tapered end with a beveled or chamfered edge 68, which can initiate the wedging action of the spacer 14 upon first insertion into the clip body 12 by engagement with the out-turned ends 28 of the clip legs 18, 20. The chamfered edge 68 can further allow for easy sliding of the spacer 14 in the clip interior 24.

Optionally, the ribs 58 can be provided at either side of a window 70 in each spacer leg 42, 44. The window 70, which can be formed as opening through each spacer leg 42, 44, can be sufficiently large so that the medial barbs 32 may pass therethrough upon sliding movement of the spacer 14 to the final position in which the clip body 12 is in the engaged configuration. Optionally, a ramped surface 78 can be provided on each spacer leg 42, 44 adjacent the window 70 in the direction of sliding and/or linear movement of the spacer 14 against which the legs 18, 20 of the clip body 12 rest in the engaged configuration.

The at least one slot 60 can be defined in one of the clip legs 18, 20, and can comprise a narrow, elongated depression, groove, notch, slit, or aperture for receiving or admitting the at least one rib 58. In certain embodiments, the at least one slot 60 can be disposed orthogonal to the open end 26, i.e. the lengthwise extension of the slot 60 can be orthogonal, including generally orthogonal, to the open end 26, to assure that the spacer 14 slides orthogonally relative to the open end 26. In other embodiments, the at least one slot 60 can be disposed non-orthogonally to the open end 26. Optionally, at least one slot 60 is defined by each clip leg 18, 20, and/or multiple slots 60 are defined per leg 18, 20. In the illustrated embodiment, two slots 60 are defined by the first clip leg 18 and two slots 60 are defined by the second clip leg 20. The slots 60 can be elongated and the engagement of the ribs 58 with the elongated slots can constrain the spacer 14 to linear movement within the clip body 12 in the direction of elongation.

Referring to FIG. 5, the slots 60 can include a first or closed end 72 and a second or open end 74, with the closed end 72 nearer the open end 26 of the clip body 12 and the open end 74 nearer the clip end 22. The closed end 72 can be formed by an edge of the slot 60. Optionally, the slots 60 on each leg 18, 20 can be provided at either side of the medial barb 32 and between the lateral barbs 30.

With multiple ribs 58 and slots 60 provided, multiple interlocks can be formed between the ribs 58 and slots 60. The engagement or registry of the ribs 58 with the slots 60 assure that only linear movement of the spacer 14 within the clip body 12 is possible, and secures the spacer 14 in the final position, in which the clip body 12 is in the engaged configuration. The further provision of latches associated with the interlock resists movement of the spacer 14 out of the clip body 12, and reduces the possibility of the spacer 14 being displaced from the clip body 12 prior to use, such as during shipping or transit.

The edge clip assembly 10 can include at least one latch to limit the slideable withdrawal of the spacer 14 from the clip body 12. For example, the latch can prevent the spacer 14 from withdrawing past the initial position. The at least one latch can be associated with the interlock between the spacer 14 and the clip body 12, and can more specifically be associated with the at least one rib 58 of the spacer 14.

Optionally, the latch can comprise at least one locking element 76 on one of the spacer 14 or the clip body 12 which engages with an element on the other of the spacer 14 or the clip body 12 to limit the slideable withdrawal of the spacer 14 from the clip body 12. In the illustration embodiment, at least one locking element 76 is provided on each rib 58, such as at the second end 66 of the ribs 58 nearer the spacer end 46. The locking elements 76 can have a variety of shapes, including but not limited to flat, round, or barbed. The locking elements 76 can engage the closed end or edge 72 of one of the slots 60 to limit the slideable withdrawal of the spacer 14 from the clip body 12 to no further than the initial position. The provision of the open ends 74 on the slots 60 can allow for the spacer 14 to freely slide further into the clip body 12 until the medial barb 32 reaches the window 70 and engages the component 16. While shown as being spaced inwardly from the lateral sides of the spacer 14, the locking elements 76 can be provided at the lateral sides of the spacer end 42, or at various other locations on the spacer 14.

Optionally, one or both of the clip body 12 can have bilateral symmetry. For example, in the embodiment shown, the sides of the clip body 12 generally corresponding to the clip legs 18, 20 can be divided into approximate mirror images of each other along a midline separating the legs 18, 20. With reference to FIG. 4, the clip body 12 can be bilaterally symmetrical across a plane bisecting the clip body 12, i.e. a plane extending through the clip end 22 to divide the clip body 12 equally. The illustrated clip body 12 is further bilaterally symmetrical when viewed from the top, as shown in FIG. 5. With reference to FIG. 5, the clip body 12 can be bilaterally symmetrical across a plane bisecting the clip body 12, i.e. a plane extending through the medial barb 32 to divide the clip body 12 equally. With the clip body 12 being bilaterally symmetrical, the edge clip assembly 10 can be easy to assemble and use since the clip body 12 does not have a predetermined top and bottom or left and right side.

Figure 9:
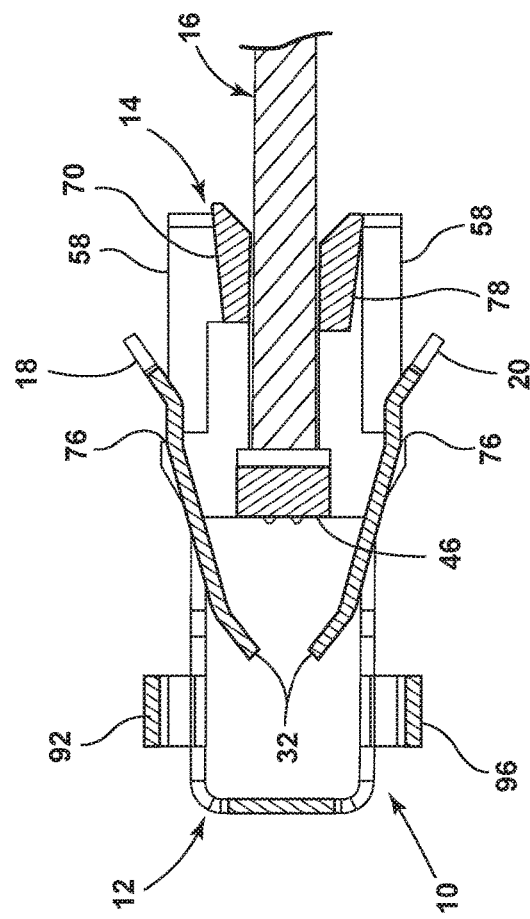
FIGS. 9-10 are sectional views showing the edge clip assembly in the initial position in which a component is initially inserted, taken at lines IX-IX and lines X-X, respectively, of FIG. 1.
Figure 10:
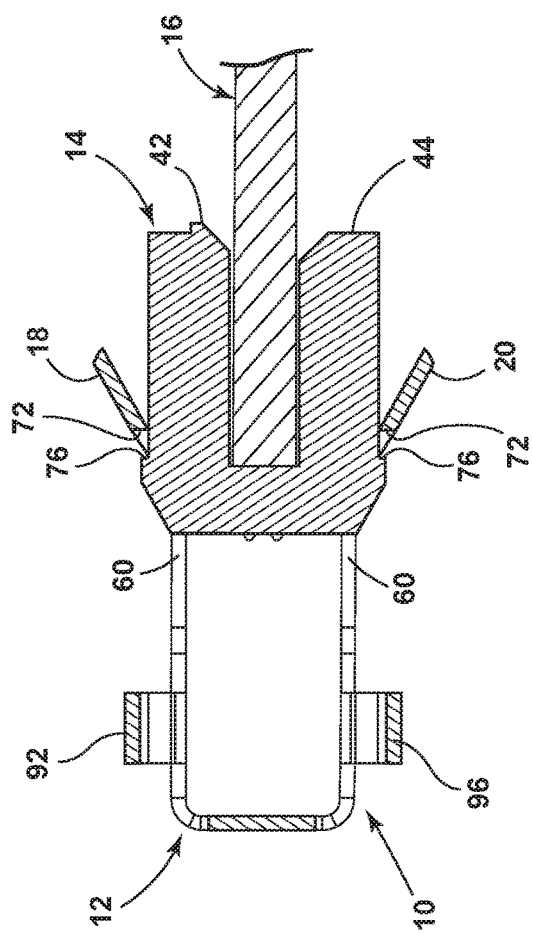

FIGS. 9-12 illustrate the insertion and capture of the component 16 by the edge clip assembly 10. The edge clip assembly 10 can be provided to an end user in a pre-attachment state as illustrated in FIGS. 9-10. In this state, the movable spacer 14 is in the initial positon and is positioned toward the open end 26 of the clip body 12. The locking elements 76 on the spacer 14 engage the closed ends 72 of the slots 60 in the clip body 12. This engagement prevents the spacer 14 from detaching from the clip body 12. As illustrated in FIGS. 9-10, the initial position of the spacer 14 maintains a widely-spaced relationship between the free ends of the clip legs 18, 20, thereby allowing insertion of the component 16 therebetween. The wedging action of the spacer 14 can be provided by the engagement of the ribs 58 with the closed ends 72 of the slots 60, and the distance between opposing outer surfaces of the ribs 58 being greater than the distance between the legs 18, 20. The chamfered edge 68 can further allow for easy sliding of the spacer 14 in the clip interior 24.

The widely spaced relationship also spaces the barbs 30, 32 on each clip leg 18, 20 apart, which can prevent interlocking of these biting features during shipping and/or transit, which can ensure that the edge clip assembly 10 is ready to use at its end destination.

Figure 11:
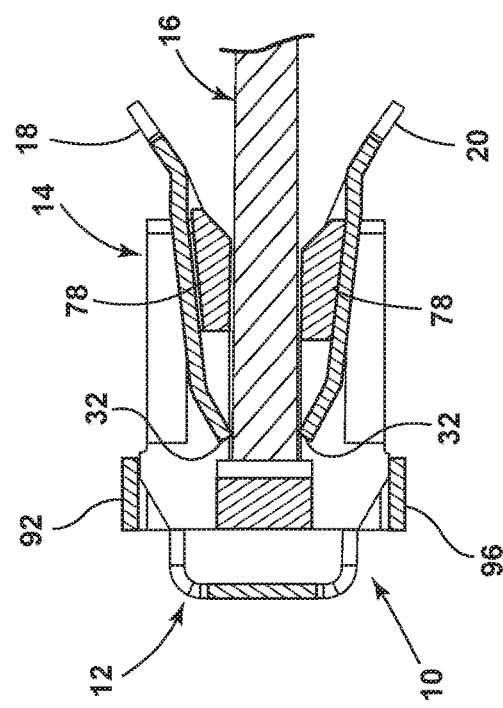
FIGS. 11-12 are sectional views showing the edge clip assembly in the final position in which the component is captured thereby, taken at lines IX-IX and lines X-X, respectively, of FIG. 1.
Figure 12:
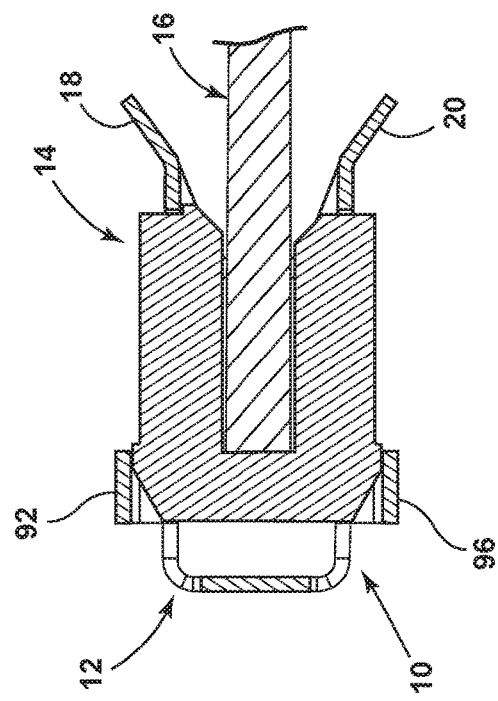

The component 16 can be inserted into the spacer 14 without substantially movement of the spacer 14 relative to the clip body 12 until the inserted end of the component 16 reaches the spacer end 46. Further insertion of the component 16 initiates sliding movement of the spacer 14 within the clip body 12 until spacer 14 reaches the final position in which the clip body 12 is in the engaged with the component 16 to hold the component 16 under tension. An example of this attachment state is illustrated in FIGS. 11-12. As illustrated in FIGS. 11-12, in the attachment state the clip legs 18, 20 are closed together and the barbs 30, 32 grip opposing surfaces of the component 16.

An exemplary method of using of the edge clip assembly 10 includes inserting the component 16 within the clip edge clip assembly 10, and more particularly within the interior 50 of the spacer 14, between the spacer legs 42, 44, and pushing the component 16 into the clip body 12 until the component 16 is captured by the clip body 12. Pushing the component 16 into the clip body 12 includes displacement of the spacer 14 between the initial position and the final position, in which the clip body 12 is in the engaged configuration and the component 16 is captured by the clip body 12. During insertion, the spacer 14 prevents scratching of the component 16 by the clip body 12 before the clip body 12 is in the engaged configuration. In the engaged configuration, the clip body 12 can be configured to apply locking tension to the component 16. Optionally, in the engaged configuration, the barbs 30, 32 can bite into the component 16 to securely hold the component 16. In certain embodiments, the component 16 comprises a material susceptible to corrosion, while the clip body 12 comprises a metal or metal alloy. In such embodiments, the spacer 14 can comprise a polymeric material to avoid the scratching or gauging of a painted surface by the barbs 30, 32, which can minimize or entirely eliminate the risk of corrosion on the component 16.

In least some embodiments, the edge clip assembly 10 is also useable to securely hold the component 16 in the absence of the spacer 14. In such an instance, the clip body 12 functions like a traditional edge clip fastener. An exemplary method of using of the edge clip assembly 10 in such an instance includes inserting the component 16 directly into with the interior 24 of the clip body 12, between the clip legs 18, 20, and pushing the component 16 into the clip body 12 until the component 14 is captured by the clip body 12. In the engaged configuration, the barbs 30, 32 can bite into the component 16 to securely hold the component 16.

Figure 13:
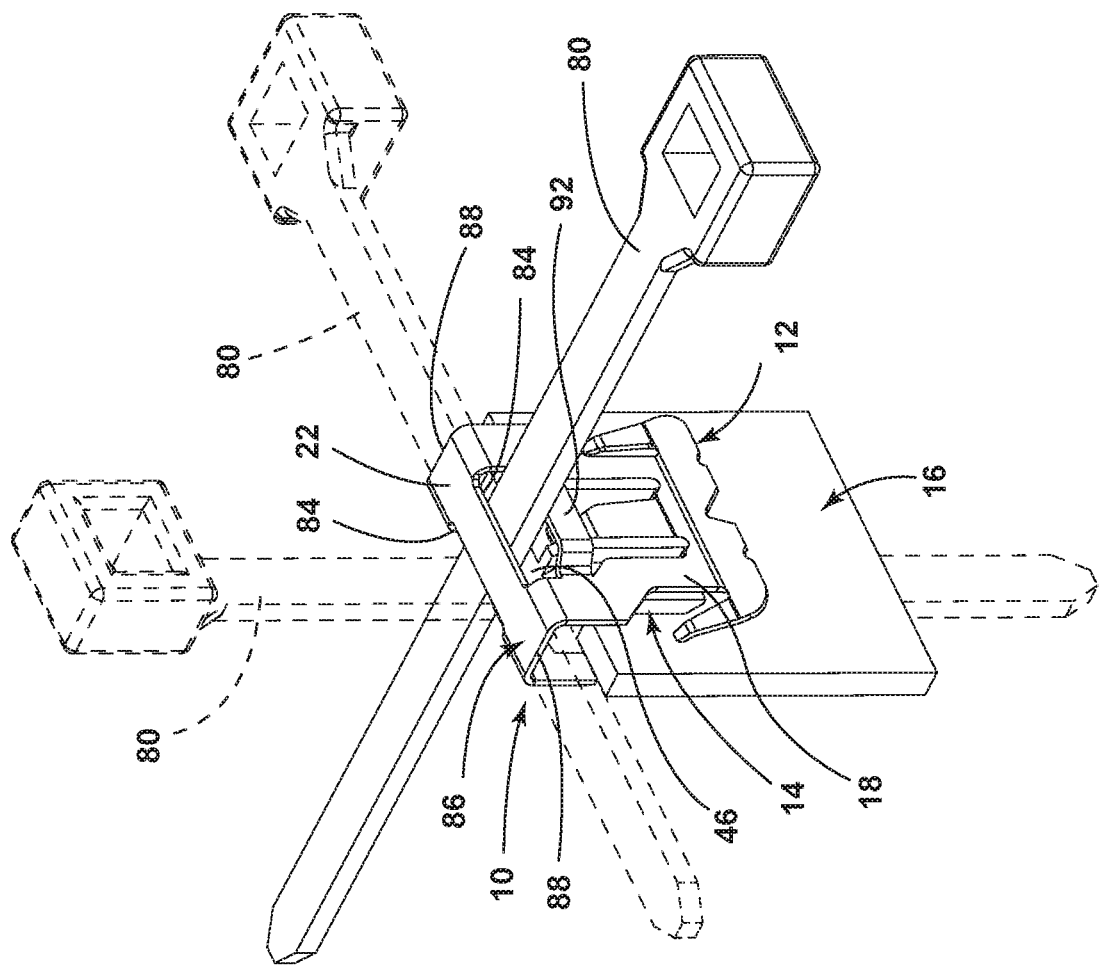
FIG. 13 is a perspective view of the edge clip assembly showing various orientations in which a cable tie can be held by the edge clip assembly.

Referring to FIG. 13, a cable tie 80 can be coupled with the edge clip assembly 10 and can be used to secure another component, not limited to a cable, to the component 16 held by the edge clip assembly 10. The edge clip assembly 10 can have at least one cable tie receiver for holding the cable tie 80. Optionally, the cable tie 80 can be held by the edge clip assembly 10 in multiple orientations. Accordingly, the edge clip assembly 10 can be provided with multiple cable tie receivers for holding the cable tie in one of the multiple orientations. Each cable tie receiver determines the orientation of the cable tie, and the cable tie can be fed through the receiver such that the head and strap ends protrude from opposing sides of the receiver. The cable tie receivers can be configured to limit movement of the cable tie relative to the edge clip assembly 10, for example to limit the rotation of the cable tie within the guide to +/−5 degrees relative to their intended orientation. FIG. 13 shows one cable tie 80 inserted in a first orientation and two other phantom-line cable ties 80 illustrating two alternative orientations.

In the illustrated embodiment, a first cable tie receiver 82 is formed between the clip end 22 and the spacer end 46, and extends through windows 84 formed in each leg 18, 20 of the clip body 12. A second cable tie receiver 86 is formed between the clip end 22 and the spacer end 46, and extends through lateral open ends 88 of the clip body 12, between the clip legs 18, 20. A third cable tie receiver 90 is formed by a guide 92 provided on the first leg 18. A fourth cable tie receiver 94 (FIG. 4) is formed by a guide 96 provided on the second leg 20. The guides 92, 96 can be U-shaped guides extending outwardly from the legs 18, 20. The edge clip assembly 10 can support a cable tie in multiple orientations in any one of the receivers 82, 86, 90, and 94, thereby offering flexible application depending on the needs of the industry.

It is noted that throughout the figures, the component 16 is illustrated as a generic wall or vehicle panel. In other cases, the edge clip assembly 10 is useable to hold other components under tension to the clip, thus providing broad application across multiple industries. In automotive applications alone, the edge clip assembly 10 can be utilized in air bag assembly, window construction, instrument panels and interior and exterior trim attachment.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

What is claimed is:

1. A self-locking edge clip assembly for attachment of a component, the edge clip assembly comprising:
   a clip body changeable between an open configuration in which a component may be freely inserted and an engaged configuration in which the component is captured thereby, the clip body comprising:
     a first clip leg, a second clip leg, and a clip end connecting the first and second clip legs;
     the first clip leg, the second clip leg, and the clip end together defining a clip interior having an open end;
     at least one of the first clip leg and the second clip leg having a slot defined thereby, wherein the slot is elongated and comprises a first end disposed toward the open end and a second end disposed toward the clip end; and
     the first clip leg and the second clip leg being in spaced apart positions to define the open end when the clip body is in the open configuration;
   a spacer slideably and linearly moveable in the clip interior between an initial position in which the clip body is in the open configuration and a final position in which the clip body is in the engaged configuration, the spacer extending partially outside the clip body when in the initial position, the spacer comprising a rib extending along a surface thereof; and
   an interlock formed by an engagement of the rib with the slot, the interlock securing the spacer in the final position;
   wherein the rib is elongated along a direction of slideable and linear movement of the spacer and comprises a first end and a second end spaced from the first end;
   wherein the rib includes a locking element on the second end of the rib, the locking element projecting into and slideable within the slot, the locking element configured to engage the first end of the slot to limit slideable withdrawal of the spacer from the clip body.

2. The edge clip assembly of claim 1, wherein the spacer comprises a polymeric material.

3. The edge clip assembly of claim 2, wherein the clip body comprises a metal or metal alloy.

4. The edge clip assembly of claim 1, wherein the spacer comprises a plurality of ribs and the clip body defines a plurality of slots.

5. The edge clip assembly of claim 1, wherein:
   the slot is a first slot defined by the first clip leg;
   the rib is a first rib;
   the interlock is a first interlock formed between the first slot and the first rib;
   the second clip leg defines a second slot; and
   the spacer comprises a second rib forming a second interlock with the second slot.

6. The edge clip assembly of claim 1, wherein the rib comprises a tapered terminal end.

7. The edge clip assembly of claim 1, wherein the clip body comprises at least one cable tie receiver configured to hold a cable tie.

8. The edge clip assembly of claim 1, wherein the slot is elongated and the interlock constrains the spacer to linear movement within the clip body in a direction of elongation.

9. The edge clip assembly of claim 1, wherein the spacer comprises a first spacer leg, a second spacer leg, and a spacer end connecting the first and second spacer legs, and wherein one of the first spacer leg or the second spacer leg comprises the rib.

10. The edge clip assembly of claim 9, wherein the first and second spacer legs are spaced apart and define an open end for insertion of the component between the first and second spacer legs, and wherein the first and second spacer legs comprise at least one tapered edge at the open end.

11. The edge clip assembly of claim 9, wherein the spacer end comprises beveled edges.

12. The edge clip assembly of claim 1, wherein the clip body is u-shaped and the spacer is u-shaped.

13. The edge clip assembly of claim 1, wherein the clip body is bilaterally symmetrical across a plane bisecting the clip body.

14. The edge clip assembly of claim 1, wherein the rib is configured to exert a force pushing the first clip leg and the second clip leg apart when the spacer is in the initial position and wherein the rib is configured to not exert a force pushing the first clip leg and the second clip leg apart when the spacer is in the final position.

15. The edge clip assembly of claim 1, wherein:
the locking element is disposed inside the slot in the initial position;
the first end of the rib is disposed outside the slot in the initial position;
the locking element is disposed inside the slot, adjacent the second end of the slot, in the final position; and
the first end of the rib is disposed within the slot, adjacent the first end of the slot, in the final position.

16. A self-locking edge clip assembly for attachment of a component, the edge clip assembly comprising:
a clip body changeable between an open configuration in which a component may be freely inserted and an engaged configuration in which the component is captured thereby, the clip body comprising:
a first clip leg, a second clip leg, and a clip end connecting the first and second clip legs;
the first clip leg, the second clip leg, and the clip end together defining a clip interior having an open end;
at least one of the first clip leg and the second clip leg having a slot defined thereby; and
the first clip leg and the second clip leg being in spaced apart positions to define the open end when the clip body is in the open configuration;
a spacer slideably and linearly moveable in the clip interior between an initial position in which the clip body is in the open configuration and a final position in which the clip body is in the engaged configuration, the spacer extending partially outside the clip body when in the initial position, the spacer comprising a rib extending along a surface thereof; and
an interlock formed between the rib and the slot, the interlock securing the spacer in the final position;
wherein the clip body comprises a plurality of cable tie receivers configured to hold cable ties.

17. A self-locking edge clip assembly for attachment of a component, the edge clip assembly comprising:
a clip body changeable between an open configuration in which a component may be freely inserted and an engaged configuration in which the component is captured thereby, the clip body comprising:
a first clip leg, a second clip leg, and a clip end connecting the first and second clip legs;
the first clip leg, the second clip leg, and the clip end together defining a clip interior having an open end;
at least one of the first clip leg and the second clip leg having a slot defined thereby; and
the first clip leg and the second clip leg being in spaced apart positions to define the open end when the clip body is in the open configuration;
a spacer slideably and linearly moveable in the clip interior between an initial position in which the clip body is in the open configuration and a final position in which the clip body is in the engaged configuration, the spacer extending partially outside the clip body when in the initial position, the spacer comprising a rib extending along a surface thereof; and
an interlock formed between the rib and the slot, the interlock securing the spacer in the final position;
wherein the rib is elongated along a direction of slideable movement of the spacer and comprises a first end and a second end spaced from the first end;
wherein the clip body comprises a barb on at least one of the first and second clip legs.

18. The edge clip assembly of claim 17, wherein the spacer comprises a window, and the barb is in register with the window in the final position in which the clip body is in the engaged configuration.

19. The edge clip assembly of claim 18, wherein the spacer comprises a ramped surface adjacent the window in a direction of slideable and linear movement of the spacer, wherein the at least one of the first and second clip legs rests against the ramped surface in the engaged configuration.

20. A self-locking edge clip assembly for attachment of a component, the edge clip assembly comprising:
a u-shaped clip body comprising a first clip leg, a second clip leg, a clip end wall connecting the first and second clip legs, and a slot in the first clip leg, wherein the slot is elongated and comprises a first end disposed away from the clip end wall and a second end disposed toward the clip end wall;
a u-shaped spacer slideably moveable in the clip body between an initial position in and a final position, the spacer comprising a first spacer leg, a second spacer leg, a spacer end wall connecting the first and second spacer legs, and a rib extending from the first spacer leg, the first and second spacer legs extending partially outside the clip body when in the initial position and being disposed entirely within the clip body when in the final position; and
an interlock formed by an engagement of the rib with the slot, the interlock securing the spacer in the final position;
wherein the rib is elongated along a direction of slideable movement of the spacer and comprises a first end and a second end spaced from the first end;
wherein the rib includes a locking element on the second end of the rib, the locking element projecting into and slideable within the slot, the locking element configured to engage the first end of the slot to limit slideable withdrawal of the spacer from the clip body.

* * * * *